United States Patent
Watanabe et al.

(10) Patent No.: US 11,287,265 B2
(45) Date of Patent: Mar. 29, 2022

(54) ROAD INFORMATION LEARNING DEVICE

(71) Applicants: DENSO CORPORATION, Kariya (JP); Honda Motor Co., Ltd., Tokyo (JP)

(72) Inventors: Takayuki Watanabe, Kariya (JP); Hiroshi Sekine, Wako (JP); Hirotaka Takiguchi, Wako (JP); Takuji Harayama, Wako (JP); Yutaka Mochizuki, Wako (JP)

(73) Assignees: DENSO CORPORATION, Kariya (JP); Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 16/586,571

(22) Filed: Sep. 27, 2019

(65) Prior Publication Data
US 2020/0025576 A1    Jan. 23, 2020

Related U.S. Application Data

(63) Continuation of application No. PCT/JP2018/013520, filed on Mar. 30, 2018.

(30) Foreign Application Priority Data

Apr. 3, 2017   (JP) .............................. JP2017-073727

(51) Int. Cl.
*G01C 21/30* (2006.01)
*G08G 1/00* (2006.01)

(52) U.S. Cl.
CPC ............... *G01C 21/30* (2013.01); *G08G 1/00* (2013.01)

(58) Field of Classification Search
None
See application file for complete search history.

(56) References Cited

U.S. PATENT DOCUMENTS

| | | | | |
|---|---|---|---|---|
| 8,180,564 B2* | 5/2012 | Shikimachi | .......... | G09B 29/004 701/410 |
| 10,883,835 B2* | 1/2021 | Matsumoto | .......... | G08G 1/0129 |
| 2009/0248293 A1* | 10/2009 | Nagase | .............. | G01C 21/3461 701/533 |
| 2013/0245936 A1* | 9/2013 | Ando | ..................... | G01C 21/12 701/501 |
| 2015/0354968 A1* | 12/2015 | Mizuno | ................. | G01C 21/32 701/534 |

FOREIGN PATENT DOCUMENTS

| | | | |
|---|---|---|---|
| JP | 4327070 B | | 9/2009 |
| JP | 2009288844 A | * | 12/2009 |
| JP | 2013140246 A | * | 7/2013 |
| JP | 2014142235 A | | 8/2014 |

* cited by examiner

*Primary Examiner* — Aniss Chad
*Assistant Examiner* — Mahmoud M Kazimi
(74) *Attorney, Agent, or Firm* — Harness, Dickey & Pierce, P.L.C.

(57) ABSTRACT

A road information learning device acquires a map extraction curve and a measurement curve for a traveling curve along which a vehicle travels, determines whether the map extraction curve and the measurement curve correspond to an identical traveling curve, and registers the measurement curve as a definitive registration curve when the map extraction curve and the measurement curve correspond to the identical traveling curve, and a predetermined definitive registration condition is satisfied.

12 Claims, 14 Drawing Sheets

FIG. 8

| LEARNING STATE | IDENTICAL-CURVE DETERMINATION RESULT | LEARNING TARGET CURVE DETERMINATION RESULT | LEARNING STATE TRANSITION DETERMINATION TARGET DATA | LEARNING STATE TRANSITION DETERMINATION RESULT | LEARNING UNNECESSITY DETERMINATION RESULT | UPDATE OF LEARNING STATE |
|---|---|---|---|---|---|---|
| UNLEARNED | NONCONFORMITY | — | — | — | — | DO NOTHING |
| UNLEARNED | CONFORMITY | NONCONFORMITY | — | — | — | DO NOTHING (DEFERMENT) |
| UNLEARNED | CONFORMITY | CONFORMITY | UNLEARNED | CONFORMITY | — | PROMOTED TO "PROVISIONAL REGISTRATION" |
| UNLEARNED | CONFORMITY | CONFORMITY | UNLEARNED | NONCONFORMITY | — | DO NOTHING (DEFERMENT) |
| PROVISIONAL REGISTRATION | NONCONFORMITY | — | — | — | — | DO NOTHING |
| PROVISIONAL REGISTRATION | CONFORMITY | CONFORMITY | PROVISIONAL REGISTRATION | CONFORMITY | NONCONFORMITY | PROMOTED TO "DEFINITIVE REGISTRATION" |
| PROVISIONAL REGISTRATION | CONFORMITY | CONFORMITY | PROVISIONAL REGISTRATION | CONFORMITY | CONFORMITY | DELETE PROVISIONAL REGISTRATION (SHIFT TO "UNLEARNED") |
| PROVISIONAL REGISTRATION | CONFORMITY | CONFORMITY | PROVISIONAL REGISTRATION | NONCONFORMITY | — | UPDATE PROVISIONAL REGISTRATION |
| DEFINITIVE REGISTRATION | NONCONFORMITY | — | — | — | — | DO NOTHING |
| DEFINITIVE REGISTRATION | CONFORMITY | NONCONFORMITY | — | — | — | DO NOTHING (DEFERMENT) |
| DEFINITIVE REGISTRATION | CONFORMITY | CONFORMITY | DEFINITIVE REGISTRATION | CONFORMITY | — | CREATE PROVISIONAL REGISTRATION (SHIFT TO "DEFINITIVE REGISTRATION" + PROVISIONAL REGISTRATION") |
| DEFINITIVE REGISTRATION | CONFORMITY | CONFORMITY | DEFINITIVE REGISTRATION | NONCONFORMITY | — | DO NOTHING |
| DEFINITIVE REGISTRATION + PROVISIONAL REGISTRATION | NONCONFORMITY | — | — | — | — | DO NOTHING |
| DEFINITIVE REGISTRATION + PROVISIONAL REGISTRATION | CONFORMITY | CONFORMITY | PROVISIONAL REGISTRATION | CONFORMITY | NONCONFORMITY | PROMOTED TO "DEFINITIVE REGISTRATION" |
| DEFINITIVE REGISTRATION + PROVISIONAL REGISTRATION | CONFORMITY | CONFORMITY | PROVISIONAL REGISTRATION | CONFORMITY | CONFORMITY | DELETE DEFINITIVE REGISTRATION AND PROVISIONAL REGISTRATION (SHIFT TO "UNLEARNED") (LEARNING UNNECESSARY) |
| DEFINITIVE REGISTRATION + PROVISIONAL REGISTRATION | CONFORMITY | CONFORMITY | PROVISIONAL REGISTRATION | NONCONFORMITY | — | UPDATE PROVISIONAL REGISTRATION |

FIG. 11

<FIRST TRAVELING>
   MAP EXTRACTION CURVE
   DEFINITIVE REGISTRATION CURVE
   PROVISIONAL REGISTRATION CURVE
   MEASUREMENT CURVE

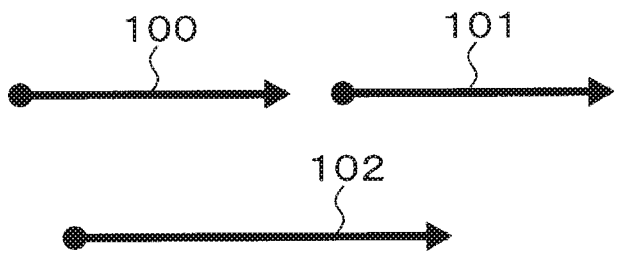

<SECOND TRAVELING>
   MAP EXTRACTION CURVE
   DEFINITIVE REGISTRATION CURVE
   PROVISIONAL REGISTRATION CURVE
   MEASUREMENT CURVE

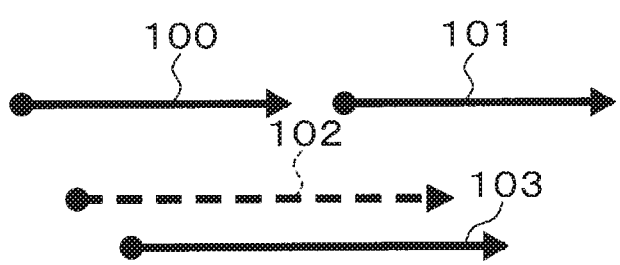

<THIRD TRAVELING>
   MAP EXTRACTION CURVE
   DEFINITIVE REGISTRATION CURVE
   PROVISIONAL REGISTRATION CURVE
   MEASUREMENT CURVE

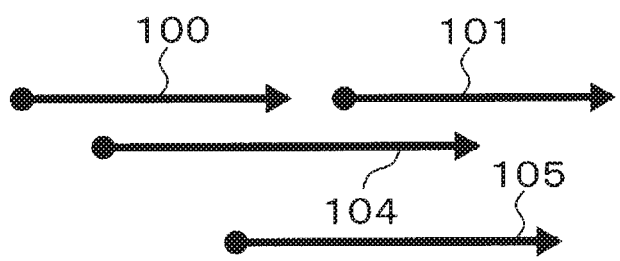

<FOURTH TRAVELING>
   MAP EXTRACTION CURVE
   DEFINITIVE REGISTRATION CURVE
   PROVISIONAL REGISTRATION CURVE
   MEASUREMENT CURVE

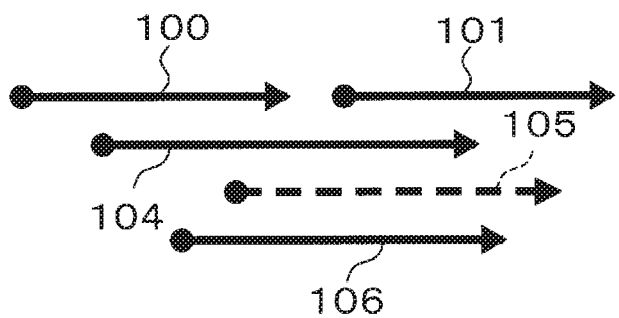

<FIFTH TRAVELING>
   MAP EXTRACTION CURVE
   DEFINITIVE REGISTRATION CURVE
   PROVISIONAL REGISTRATION CURVE
   MEASUREMENT CURVE

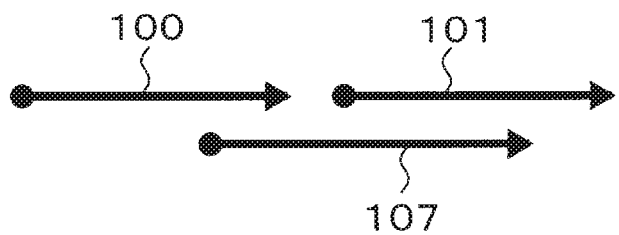

FIG. 14

<FIRST TRAVELING>
MAP EXTRACTION CURVE
DEFINITIVE REGISTRATION CURVE
PROVISIONAL REGISTRATION CURVE
MEASUREMENT CURVE

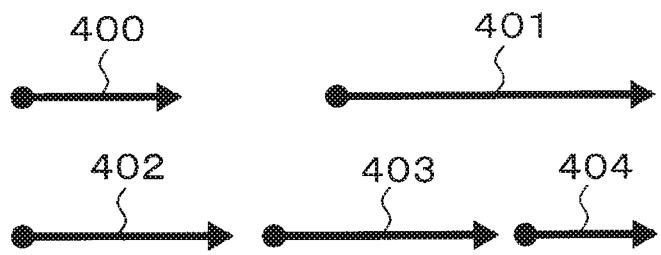

<SECOND TRAVELING>
MAP EXTRACTION CURVE
DEFINITIVE REGISTRATION CURVE
PROVISIONAL REGISTRATION CURVE
MEASUREMENT CURVE

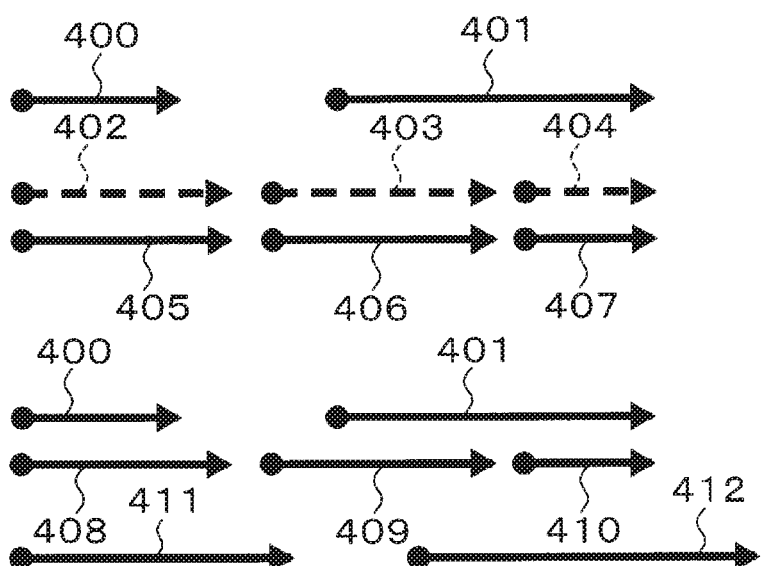

<THIRD TRAVELING>
MAP EXTRACTION CURVE
DEFINITIVE REGISTRATION CURVE
PROVISIONAL REGISTRATION CURVE
MEASUREMENT CURVE

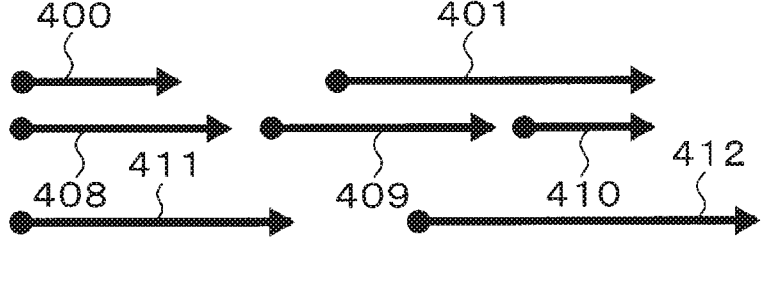

<FOURTH TRAVELING>
MAP EXTRACTION CURVE
DEFINITIVE REGISTRATION CURVE
PROVISIONAL REGISTRATION CURVE
MEASUREMENT CURVE

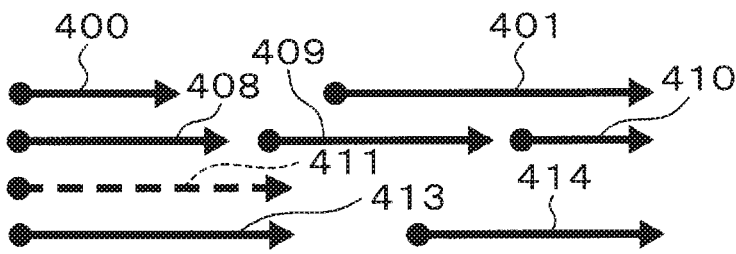

<FIFTH TRAVELING>
MAP EXTRACTION CURVE
DEFINITIVE REGISTRATION CURVE
PROVISIONAL REGISTRATION CURVE
MEASUREMENT CURVE

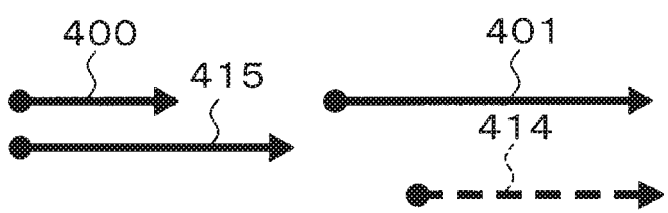

ROAD INFORMATION LEARNING DEVICE

CROSS REFERENCE TO RELATED APPLICATIONS

The present application is a continuation application of International Patent Application No. PCT/JP2018/013520 filed on Mar. 30, 2018, which designated the U.S. and claims the benefit of priority from Japanese Patent Application No. 2017-073727 filed on Apr. 3, 2017. The entire disclosures of all of the above applications are incorporated herein by reference.

TECHNICAL FIELD

The present disclosure relates to a road information learning device.

BACKGROUND

There is known a technique in which, when a shape of a curve extracted from map data and a shape of a curve extracted from a traveling locus of a vehicle are different from each other, road data is modified to make the shapes of both the curves equal to each other, so that reliability of the operation of a driving safety device is improved.

SUMMARY

The present disclosure provides a road information learning device that acquires a map extraction curve and a measurement curve for a traveling curve along which a vehicle travels, that determines whether the map extraction curve and the measurement curve correspond to an identical traveling curve, and that registers the measurement curve as a definitive registration curve when the map extraction curve and the measurement curve correspond to the identical traveling curve, and a predetermined definitive registration condition is satisfied.

BRIEF DESCRIPTION OF DRAWINGS

Objects, features and advantages of the present disclosure will become apparent from the following detailed description made with reference to the accompanying drawings. In the drawings:

FIG. 8 is a table showing an example of a state transition of the curve information;

FIG. 11 is a diagram showing an example of learning curve information (part 1);

FIG. 14 is a diagram showing an example of learning curve information (part 4).

DETAILED DESCRIPTION

When a vehicle travels on a curve in an out-in-out manner, the vehicle does not necessarily travel in accordance with a curve shape of a road. For that reason, there may be a case in which there are multiple curve shapes extracted from a traveling locus with respect to one curve shape extracted from a map data. Conversely, for example, when the accuracy of the map data is low, the multiple curve shapes may be extracted from the map data for one curve. One curve shape or multiple curve shapes extracted from the traveling locus of the vehicle may be associated with the multiple curve shapes extracted from the map data. In other words, in actual road learning, the curve shape extracted from the map data and the curve shape extracted from the traveling locus of the vehicle are rarely associated with each other in a one-to-one relationship.

A road information learning device according to an aspect of the present disclosure includes a curve information acquisition unit, an identical-curve determination unit, and a definitive registration unit. The curve information acquisition unit is configured to acquire a map extraction curve extracted from map data and a measurement curve extracted from a traveling locus of a vehicle for a traveling curve along which the vehicle travels. The identical-curve determination unit is configured to determine whether the map extraction curve and the measurement curve acquired by the curve information acquisition unit correspond to an identical traveling curve. The definitive registration unit is configured to register the measurement curve as a definitive registration curve when the identical-curve determination unit determines that the map extraction curve and the measurement curve correspond to the identical traveling curve, and a predetermined definitive registration condition is satisfied.

According to the road information learning device described above, it is determined whether the map extraction curve extracted from the map data and the measurement curve extracted from the traveling locus of the vehicle correspond to the identical traveling curve. As a result, the road learning can be performed after associating the curve shape extracted from the map data with the curve shape extracted from the traveling locus of the vehicle, and an accurate road learning can be performed in accordance with the actual travel situation.

Figure 1:
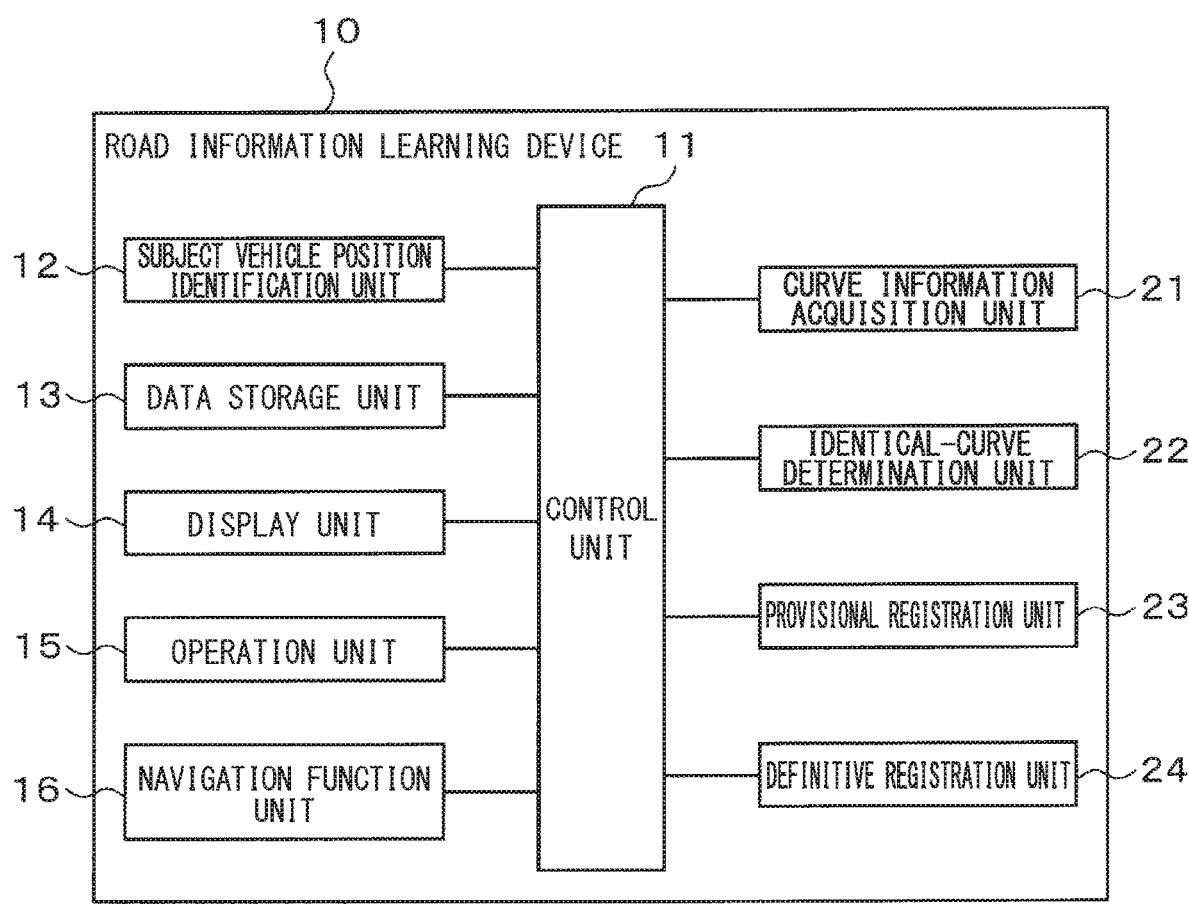
FIG. 1 is a block diagram schematically showing a configuration example of a road information learning device according to the present embodiment.

Hereinafter, an embodiment of a road information learning device will be described with reference to the drawings. A road information learning device 10 illustrated in FIG. 1 is mounted on a vehicle, for example, and includes a control unit 11, a subject vehicle position identification unit 12, a data storage unit 13, a display unit 14, an operation unit 15, and a navigation function unit 16, and other units. Hereinafter, the road information learning device 10 is referred to as a "learning device 10". The control unit 11 mainly includes a microcomputer (not shown) and controls the overall operation of the learning device 10.

The subject vehicle position identification unit 12 includes various sensors for position measurement, such as a geomagnetic sensor, a gyroscope, a distance sensor, and a radio wave receiver for positioning, which are not shown. The subject vehicle position identification unit 12 measures a position of the subject vehicle based on radio waves received from positioning satellites configuring a positioning system (not shown) and detection values of the various sensors. Then, the subject vehicle position identification unit 12 outputs subject vehicle position information indicating the measurement position to the control unit 11. The control unit 11 can identify a traveling locus of the vehicle based on multiple pieces of vehicle position information input from the subject vehicle position identification unit 12.

The data storage unit 13 is configured by, for example, a storage medium such as a hard disk drive, and stores various types of data such as map data. The map data includes road network data including node information relating to a number of nodes included in a road, and link information relating to a link connecting each node. The node information includes position information of each node. The link information includes information such as a shape and a distance of each link. The map data includes various types of data necessary for executing route guidance of the vehicle, such as background data and map matching data. The map data includes data for identifying a position of a curve and a road shape.

The display unit 14 is configured by, for example, a liquid crystal display, and displays various screens such as a route guidance screen and a setting screen based on a display command signal from the control unit 11. The operation unit 15 includes a touch panel switch provided in the display unit 14, and a mechanical switch provided in the periphery of the display unit 14, and outputs an operation signal to the control unit 11 in response to an operation of various switches by a user. The navigation function unit 16 includes a guidance route search processing unit for searching for a guidance route of the vehicle, and executes route guidance of the vehicle based on information such as the searched guide route, map data, and the position of the vehicle.

The control unit 11 may include a processor that executes a control program stored in a memory to virtually realize a curve information acquisition unit 21, the identical-curve determination unit 22, a provisional registration unit 23, and a definitive registration unit 24 by software. Note that those processing units may be realized by hardware, or may be realized by a combination of software and hardware. The curve information acquisition unit 21 acquires the map extraction curve extracted from the map data and the measurement curve extracted from the actual traveling locus of the vehicle with respect to the traveling curve along which the vehicle has traveled. The identical-curve determination unit 22 determines whether the map extraction curve acquired by the curve information acquisition unit 21 and the measurement curve correspond to an identical traveling curve.

Figure 2:
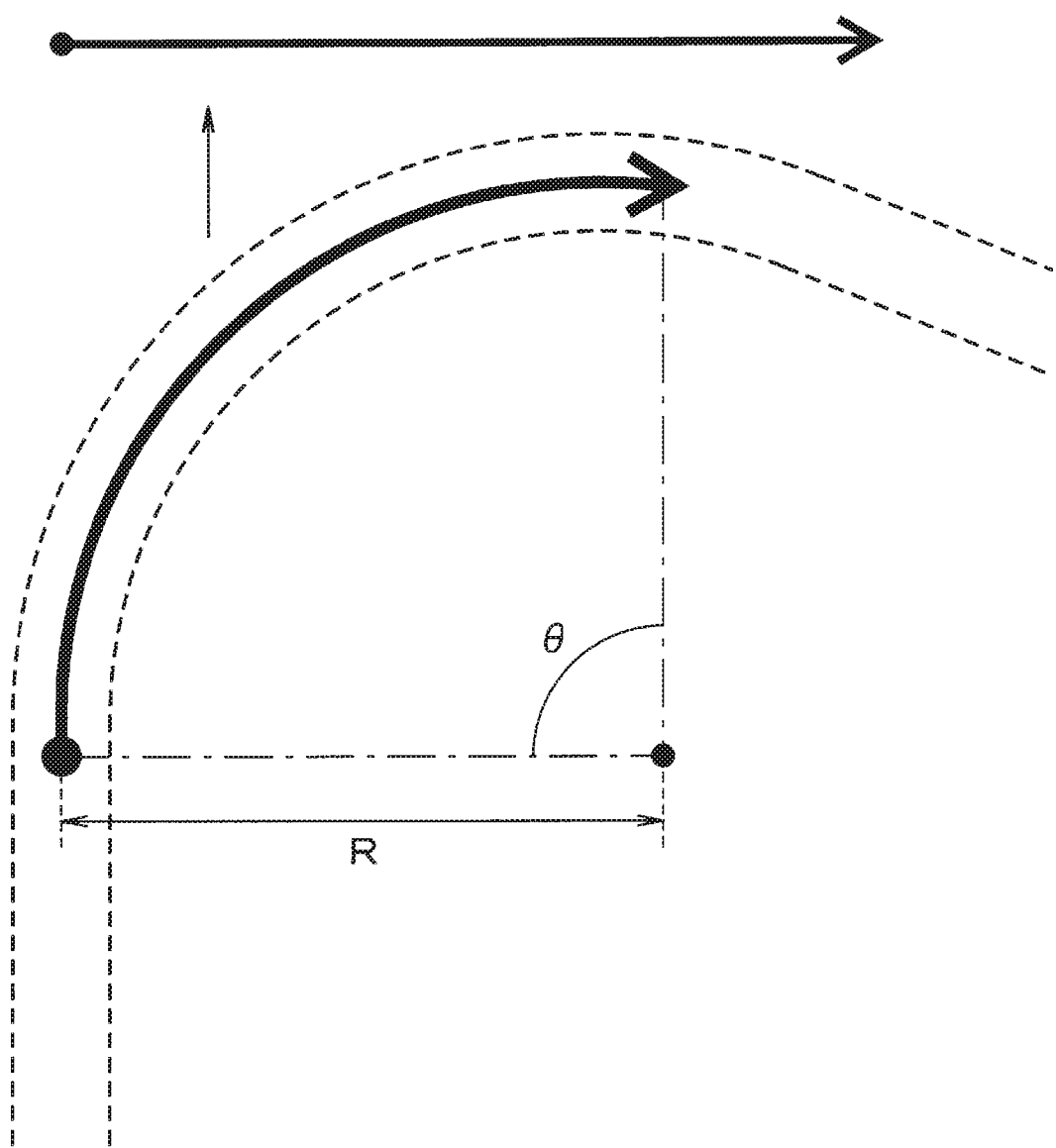
FIG. 2 is a diagram showing an example of a curve shape.

An example of the determination process by the identical-curve determination unit 22 will be described. As illustrated in FIG. 2, the actual curve is accurately curved, but in the present embodiment, for convenience of description, the curve is expressed in a straight line state.

When the map extraction curve and the measurement curve satisfy, for example, all of the following conditions, the identical-curve determination unit 22 determines that the map extraction curve and the measurement curve correspond to the identical traveling curve.

Identical-Curve Determination Conditions:
Condition 1: A traveling direction of the measurement curve coincides with a traveling direction of the map extraction curve.
Condition 2: Curve polarities of the measurement curve and the map extraction curve coincide with each other.
Condition 3: Any of the following conditions is satisfied.
Condition 3a: A section of the map extraction curve is included in a section of the measurement curve.
Condition 3b: A section of the measurement curve is included in the map extraction curve.
Condition 3c: An entrance error between the map extraction curve and the measurement curve is, for example, ±20% or less of a section length of the map extraction curve.
Condition 3d: An exit error between the map extraction curve and the measurement curve is, for example, ±20% or less of the section length of the map extraction curve.

The curve polarity is a parameter indicating a direction in which the curve bends, that is, whether the curve is a right curve or a left curve. The entrance error is a parameter indicating a deviation between an entrance position of the map extraction curve and an entrance position of the measurement curve. The exit error is a parameter indicating a deviation between an exit position of the map extraction curve and an exit position of the measurement curve. Further, as the identical-curve determination condition, for example, a condition that the map extraction curve to be determined is not associated with another measurement curve, that the measurement curve to be determined is not associated with another map extraction curve, or that a travel control such as an anti-lock brake system control is not performed within a traveling curve section in which the measurement curve is extracted may be added.

Figure 3:
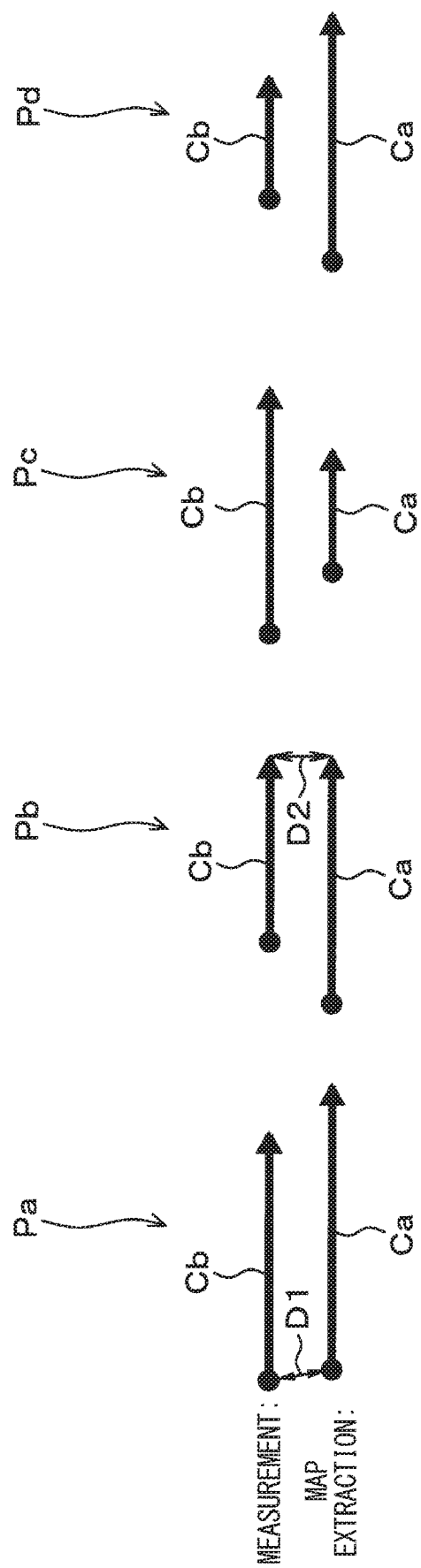
FIG. 3 is a diagram showing an example of an identical-curve determination process (part 1)

FIG. 3 shows an example of determination in a case where the map extraction curve and the measurement curve have a one-to-one relationship. In other words, in a pattern Pa of FIG. 3, a map extraction curve Ca and a measurement curve Cb in which an entrance error D1 satisfies the identical-curve determination condition are determined to be curves corresponding to an identical traveling curve. In a pattern Pb of FIG. 3, it is determined that a map extraction curve Ca and a measurement curve Cb in which an exit error D2 satisfies the identical-curve determination condition are curves corresponding to an identical traveling curve.

In a pattern Pc of FIG. 3, it is determined that a measurement curve Cb and a map extraction curve Ca included in the measurement curve Cb are curves corresponding to an identical traveling curve. In a pattern Pd of FIG. 3, it is determined that a map extraction curve Ca and a measurement curve Cb included in the map extraction curve Ca are curves corresponding to an identical traveling curve.

Figure 4:
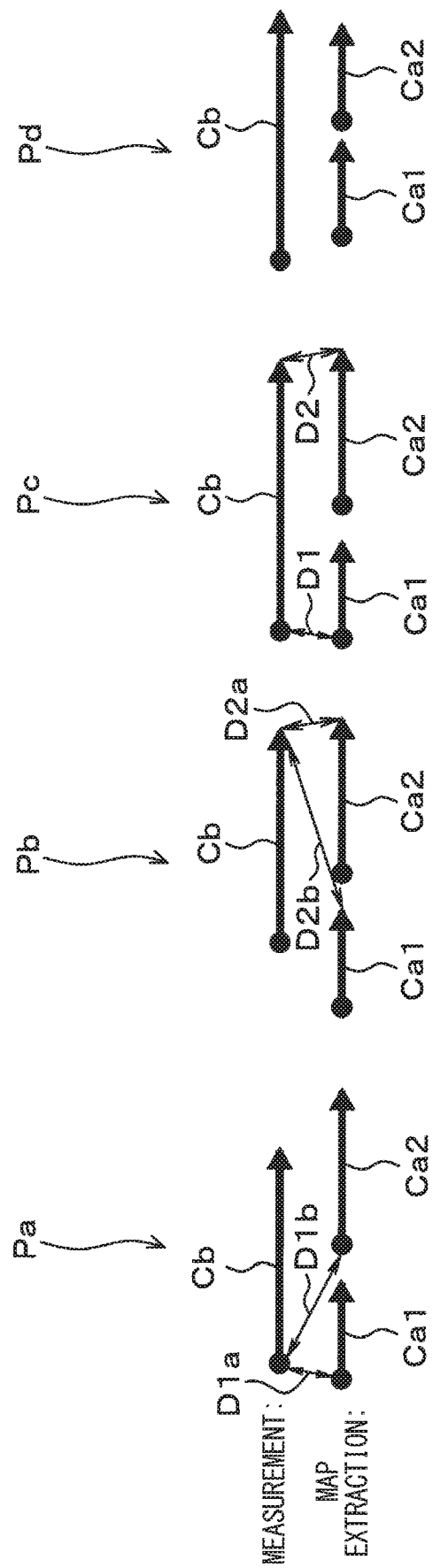
FIG. 4 is a diagram showing an example of the identical-curve determination process (part 2)

FIG. 4 shows a determination example in a case where multiple map extraction curves exist for one measurement curve. In other words, in a pattern Pa of FIG. 4, a map extraction curve Ca1 and a measurement curve Cb in which an entrance error D1*a* satisfies the identical-curve determination condition are determined to be curves corresponding to an identical traveling curve. At that time, a map extraction curve Ca2 and the measurement curve Cb in which an entrance error D1*b* does not satisfy the identical-curve determination condition are not determined to be curves corresponding to the identical traveling curve.

Further, in a pattern Pb in FIG. 4, a map extraction curve Ca2 and a measurement curve Cb in which an exit error D2*a* satisfies the identical-curve determination condition are determined to be curves corresponding to an identical traveling curve. At that time, a map extraction curve Ca1 and the measurement curve Cb in which an exit error D2*b* does not satisfy the identical-curve determination condition are not determined to be curves corresponding to an identical traveling curve.

Further, in a pattern Pc of FIG. 4, there is a set of a map extraction curve Ca1 and a measurement curve Cb in which an entrance error D1 satisfies the identical-curve determined condition, and a set of a map extraction curve Ca2 and the measurement curve Cb in which an exit error D2 satisfies the identical-curve determination condition. In that case, the identical-curve determination unit 22 selects a map extraction curve having a large lap length with the measurement curve Cb, in that case, the map extraction curve Ca2, and determines that the map extraction curve Ca2 and the measurement curve Cb are curves corresponding to an identical traveling curve. It should be noted that the identical-curve determination unit 22 can also be set so as to associate the multiple map extraction curves Ca1, Ca2 with one measurement curve Cb. The lap length indicates a length of a section in which the multiple curves overlap with each other.

In a pattern Pd of FIG. 4, multiple map extraction curves Ca1 and Ca2 having the same lap length with a measurement curve Cb exist. In that case, the identical-curve determination unit 22 prioritizes the map extraction curve Ca1 on a near side, that is, on the entrance side of the measurement curve Cb, and determines that the map extraction curve Ca1 is a curve corresponding to an identical traveling curve. It should be noted that the identical-curve determination unit 22 can also be set so as to associate the multiple map extraction curves Ca1, Ca2 with one measurement curve Cb.

Figure 5:
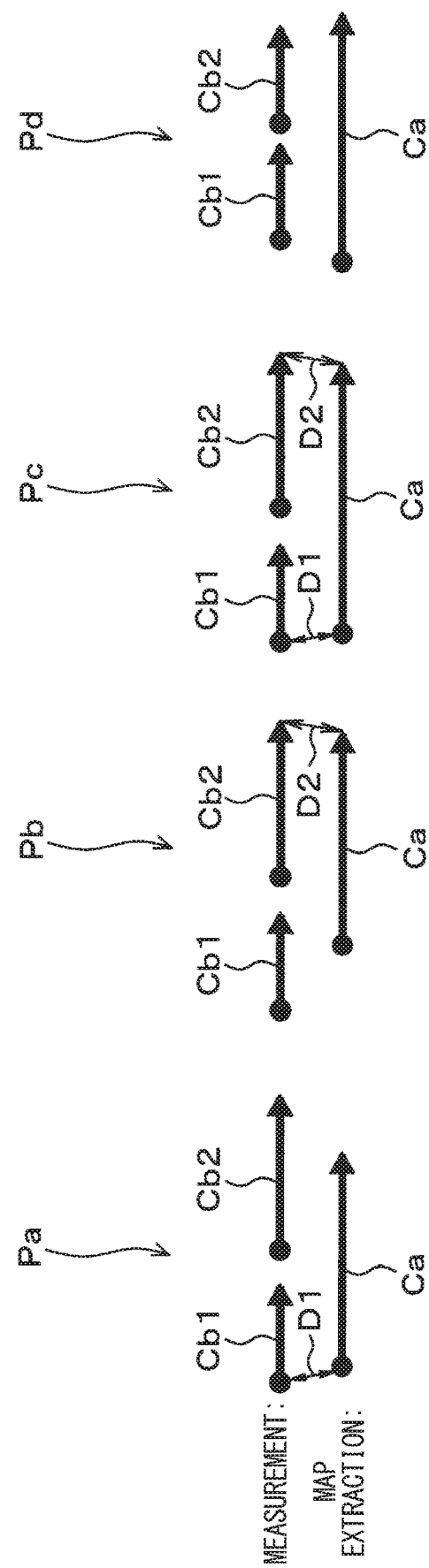
FIG. 5 is a diagram showing an example of the identical-curve determination process (part 3)

FIG. 5 shows a determination example in which multiple measurement curves exist for one map extraction curve. In other words, in a pattern Pa of FIG. 5, a map extraction curve Ca and a measurement curve Cb1 in which an entrance error D1 satisfies the identical-curve determination condition are determined to be curves corresponding to an identical traveling curve. At that time, the identical-curve determination unit 22 also associates a measurement curve Cb2 consecutive to an exit of the measurement curve Cb1 with the map extraction curve Ca.

In a pattern Pb of FIG. 5, a map extraction curve Ca and a measurement curve Cb2 in which an exit error D2 satisfies the identical-curve determination condition are determined to be curves corresponding to an identical traveling curve. At that time, the identical-curve determination unit 22 also associates a measurement curve Cb1 consecutive to an entrance of the measurement curve Cb2 with the map extraction curve Ca.

In a pattern Pc of FIG. 5, a map extraction curve Ca and a measurement curve Cb1 in which an entrance error D1 satisfies the identical-curve determination condition are determined to be curves corresponding to an identical traveling curve. At that time, the identical-curve determination unit 22 also associates a measurement curve Cb2 consecutive to an exit of the measurement curve Cb1 with the map extraction curve Ca. In that instance, an exit error D2 of the map extraction curve Ca and the measurement curve Cb2 also satisfy the identical-curve determination condition. Thus, the identical-curve determination unit 22 may perform a determination process of determining that the map extraction curve Ca and the measurement curve Cb2 are curves corresponding to an identical traveling curve, and also associating the measurement curve Cb1 consecutive to an entrance of the measurement curve Cb2 with the map extraction curve Ca.

In a pattern Pd of FIG. 5, a measurement curve Cb1 is included in a map extraction curve Ca. At that time, the identical-curve determination unit 22 determines that the measurement curve Cb1 and the map extraction curve Ca correspond to an identical traveling curve, and also associates a measurement curve Cb2 consecutive to an exit of the measurement curve Cb1 with the map extraction curve Ca. In this example, the measurement curve Cb2 is also included in the map extraction curve Ca. Thus, the identical-curve determination unit 22 may perform a determination process of determining that the measurement curve Cb2 and the map extraction curve Ca are curves corresponding to an identical traveling curve, and also associating the measurement curve Cb1 consecutive to an entrance of the measurement curve Cb2 with the map extraction curve Ca.

Figure 6:
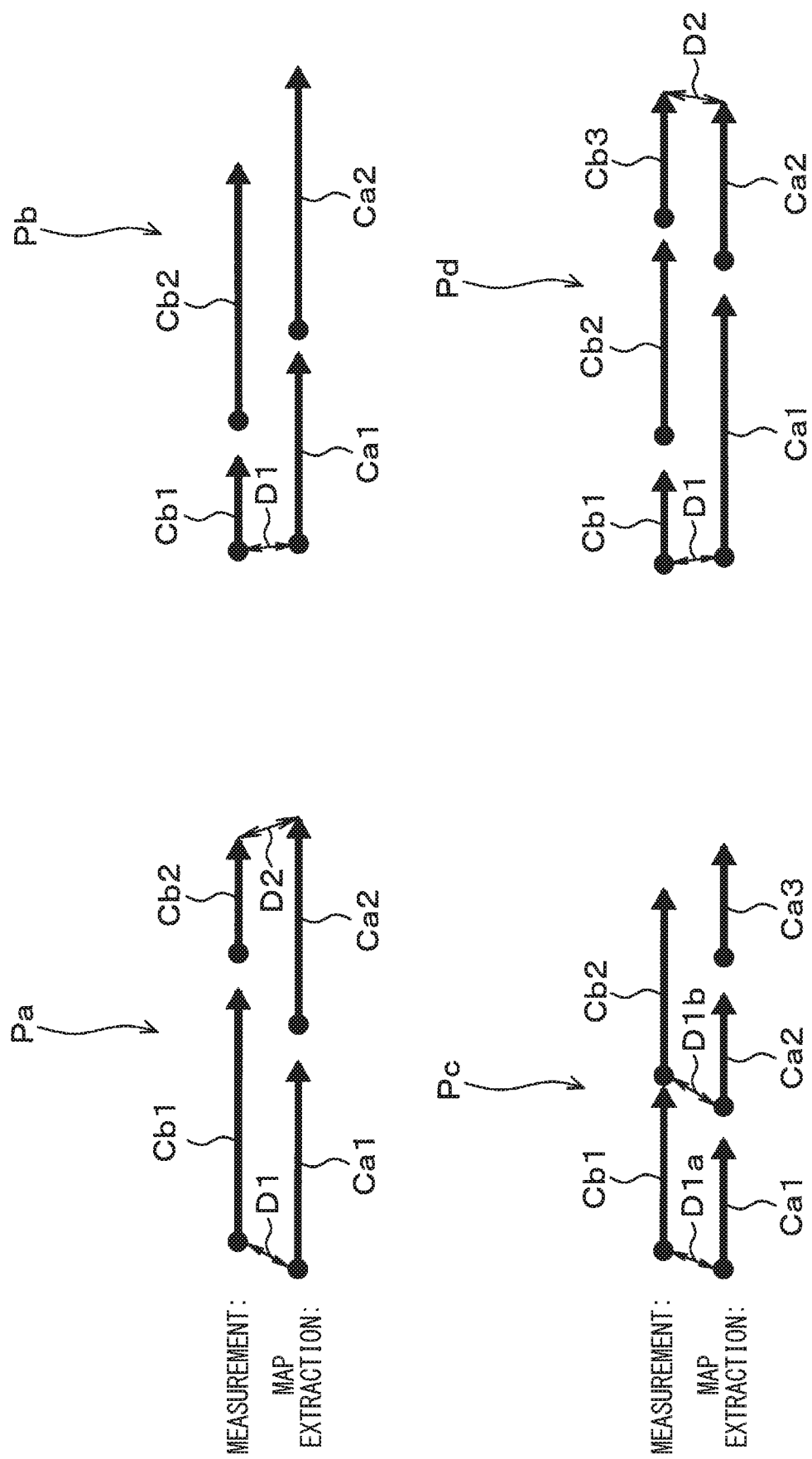
FIG. 6 is a diagram showing an example of an identical-curve determination process (part 4)

FIG. 6 shows a determination example in which multiple measurement curves exist for multiple map extraction curves. The determination example in this case is a combination of the determination examples described above. In other words, in a pattern Pa of FIG. 6, a map extraction curve Ca1 and a measurement curve Cb1 in which an entrance error D1 satisfies the identical-curve determination condition are determined to be curves corresponding to an identical traveling curve. Further, a map extraction curve Ca2 and a measurement curve Cb2 in which an exit error D2 satisfies the identical-curve determination condition are determined to be curves corresponding to an identical traveling curve.

In a pattern Pb of FIG. 6, a map extraction curve Ca1 and a measurement curve Cb1 in which an entrance error D1 satisfies the identical-curve determination condition are determined to be curves corresponding to an identical traveling curve. In addition, a measurement curve Cb2 consecutive to an exit of the measurement curve Cb1 is also associated with the map extraction curve Ca1. A map extraction curve Ca2 is not associated with any measurement curve Cb1 and Cb2.

In a pattern Pc of FIG. 6, a map extraction curve Ca1 and a measurement curve Cb1 in which an entrance error D1a satisfies the identical-curve determination condition are determined to be curves corresponding to an identical traveling curve. Further, it is determined that a map extraction curve Ca2 and a measurement curve Cb2 in which tan entrance error D1b satisfies the identical-curve determination condition are curves corresponding to an identical traveling curve. A map extraction curve Ca3 is not associated with any measurement curve Cb1 and Cb2.

In a pattern Pd of FIG. 6, a map extraction curve Ca1 and a measurement curve Cb1 in which an entrance error D1 satisfies the identical-curve determination condition are determined to be curves corresponding to an identical traveling curve. In addition, a measurement curve Cb2 consecutive to an exit of the measurement curve Cb1 is also associated with the map extraction curve Ca1. Further, it is determined that a map extraction curve Ca2 and a measurement curve Cb3 in which an exit error D2 satisfies the identical-curve determination condition are curves corresponding to an identical traveling curve.

The provisional registration unit 23 registers the measurement curve as the provisional registration curve when the identical-curve determination unit 22 determines that the map extraction curve and the measurement curve correspond to the identical traveling curve and when the map extraction curve and the measurement curve satisfy a predetermined provisional registration condition.

In that case, the provisional registration condition is, for example, the following conditions. In other words, when any of the following conditions is satisfied, the measurement curve is provisionally registered. In the following provisional registration conditions, R represents a radius of the curve, θ represents a depth of the curve, and ABS represents a function for obtaining an absolute value of the calculation result in parentheses.

Provisional Registration Conditions:

Provisional registration condition 1: R of the map extraction curve/R of the measurement curve<0.90 or 1.10<R of the map extraction curve/R of the measurement curve Provisional registration condition 2: θ of the map extraction curve/θ of the measurement curve<0.90 or 1.10<θ of the map extraction curve/θ of the measurement curve Provisional registration condition 3: 10% of the section length of the map extraction curve<ABS (entrance position of map extraction curve−entrance position of measurement curve)

Provisional registration condition 4: 10% of section length of the map extraction curve<ABS (the exit position of the map extraction curve−the exit position of the measurement curve)

When the vehicle travels again on the traveling curve, if the provisional registration curve corresponding to the traveling curve and a new measurement curve, which is the measurement curve newly acquired by the curve information acquisition unit for the traveling curve, satisfy the predetermined definitive registration condition, the definitive registration unit 24 registers the curve obtained by averaging the provisional registration curve and the new measurement curve as the definitive registration curve.

In that case, the definitive registration conditions are, for example, the following conditions. In other words, when all of the following conditions are satisfied, the provisional registration curve is finally registered as an average value with the new measurement curve. In the following definitive registration conditions, R represents a radius of the curve, θ represents a depth of the curve, and ABS represents a function for obtaining an absolute value of the calculation result in parentheses.

Definitive Registration Conditions:

Definitive registration condition 1: The number of provisional registration curves matches the number of new measurement curves.

Definitive registration condition 2: 0.90≤R of the provisional registration curve/R of the new measurement curve≤1.10

Definitive registration condition 3: 0.90≤θ of the provisional registration curve/θ of the new measurement curve≤1.10

Definitive registration condition 4: ABS (the entrance position of the provisional registration curve−the entry position of the new measurement curve)≤for example, 10% of the section length of the provisional registration curve Definitive registration condition 5: ABS (the exit position of the provisional registration curve−the exit position of the new measurement curve)≤for example, 10% of the section length of the provisional registration curve Even when the above definitive registration conditions are satisfied, the provisional registration curve is not promoted to the definitive registration curve when all of the learning unnecessary conditions exemplified below are satisfied. In the following learning unnecessary conditions, R represents a radius of the curve, θ represents a depth of the curve, and ABS represents a function for obtaining the absolute value of the calculation result in parentheses.

Learning Unnecessary Conditions:

Learning unnecessary condition 1: 0.90≤R of the map extraction curve/the average value of R of the provisional registration curve and R of the new measurement curve≤1.10

Learning unnecessary condition 2: 0.90≤θ of the map extraction curve/the average value of θ of the provisional registration curve and θ of the new measurement curve≤1.10

Learning unnecessary condition 3: ABS (the entrance position of the map extraction curve−the average position of the entrance position of the provisional registration curve and the entrance position of the new measurement curve) ≤for example, 10% of the section length of the map extraction curve Learning unnecessary condition 4: ABS (the exit position of the map extraction curve−the average position of the exit position of the provisional registration curve and the exit position of the new measurement curve)≤for example, 10% of the section length of the map extraction curve In addition, the learning device 10 is configured to shift the learning curve that has been registered once to the "definitive registration+provisional registration" state when a predetermined "definitive registration+provisional registration" condition is satisfied in a relationship to the new measurement curve that is newly acquired thereafter. In that case, the "definitive registration+provisional registration" condition is, for example, the following condition. In other words, for example, in a case where any of the following conditions is satisfied, the learning curve that has been registered is shifted to the "definitive registration+provisional registration curve". In the following "definitive registration+provisional registration" condition, R represents a radius of the curve, θ represents a depth of the curve, and ABS represents a function for obtaining the absolute value of the calculation result in parentheses.

"Definitive registration+provisional registration" conditions:

"Definitive registration+provisional registration" condition 1: R of the learning curve in the definitive registration/R of the new measurement curve<0.90 or 1.10<R of the learning curve in the definitive registration/R of the new measurement curve "Definitive registration+provisional registration" condition 2: θ of the learning curve in the definitive registration/θ of the new measurement curve<0.90 or 1.10<θ of the learning curve in the definitive registration/θ of the new measurement curve "Definitive registration+provisional registration" condition 3: for example, 10% of the section length of the learning curve in the definitive registration<ABS (the entrance position of the learning curve in the definitive registration−the entrance position of the new measurement curve)

"Definitive registration+provisional registration" condition 4: for example, 10% of the section length of the learning curve in the definitive registration<ABS (the exit position of the learning curve in the definitive registration−the exit position of the new measurement curve)

When the curve shifted to the "definitive registration+provisional registration" state satisfies the definitive registration condition described above in a relationship to the new measurement curve that is newly acquired, the learning device 10 performs the definitive registration again on the average curve of the shifted curve and the new measurement curve. Also, in that case, when the learning unnecessary condition described above is satisfied, a promotion to the definitive registration is not performed.

Figure 7:
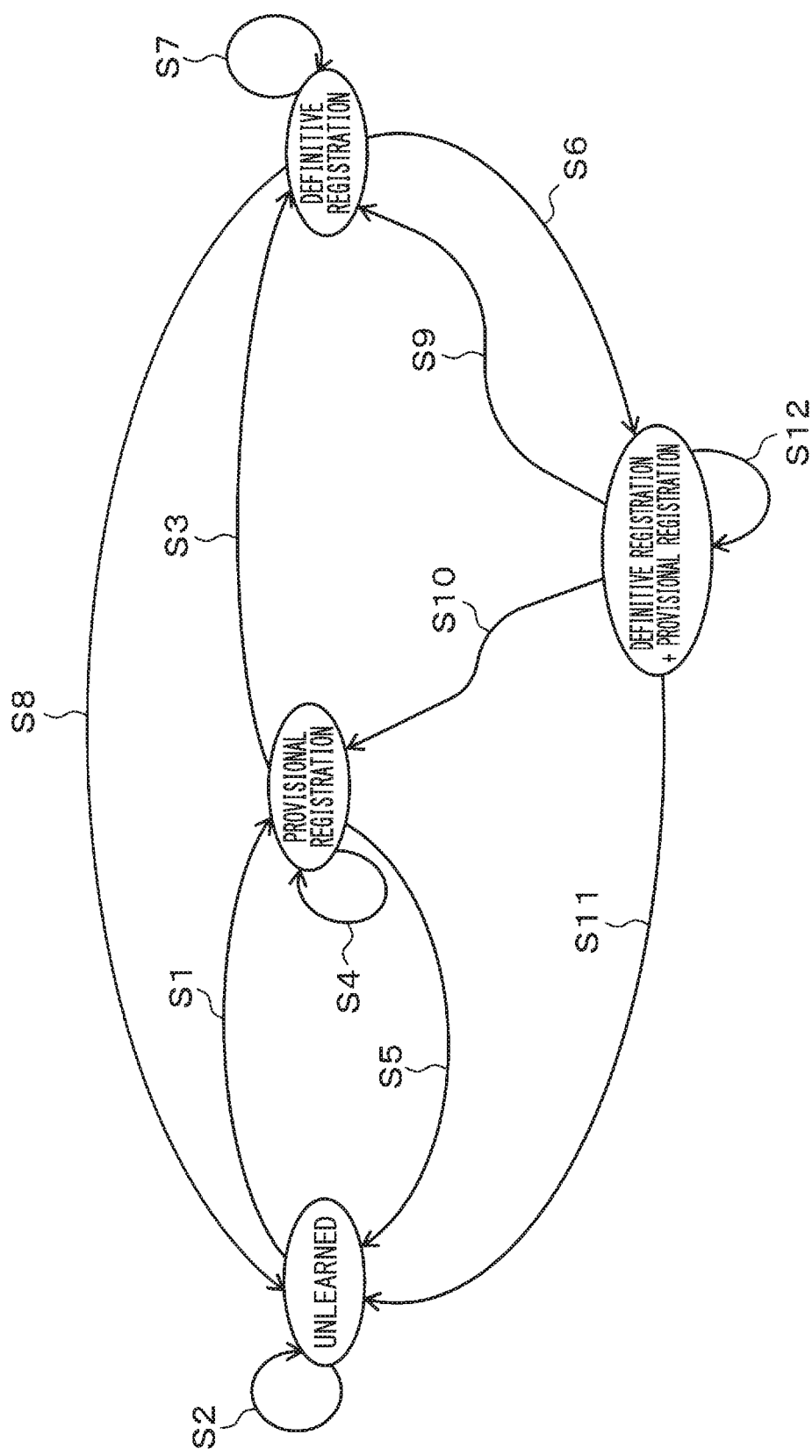
FIG. 7 is a transition diagram showing an example of a state transition of curve information.

The learning device 10 performs learning while shifting the acquired curve information in multiple stages by the provisional registration unit 23 and the definitive registration unit 24. As illustrated in FIGS. 7 and 8, the learning device 10 is configured to allow the obtained curve information to dynamically transition among multiple states of "unlearned state", "provisional registration state", "definitive registration state", and "definitive registration+provisional registration state". In other words, when the obtained curve information satisfies the provisional registration condition, the learning device 10 shifts the curve information to the provisional registration state as indicated by an arrow S1. When the obtained curve information does not satisfy the provisional registration condition, the learning device 10 keeps the curve information in the unlearned state as indicated by an arrow S2.

When the provisionally registered curve information satisfies the definitive registration condition in relation to the new measurement curve, the learning device 10 shifts the curve information to the definitive registration state as indicated by an arrow S3. When the provisionally registered curve information does not satisfy the definitive registration condition in relation to the new measurement curve, the learning device 10 updates the provisional registration state of the curve information as indicated by an arrow S4. At that time, the learning device 10 may update the provisionally registered curve information with the new measurement curve. When the provisionally registered curve information satisfies the learning unnecessary condition, the learning device 10 cancels the provisional registration state of the curve information and shifts to the unlearned state, as indicated by an arrow S5.

Further, when the curve information that has been definitively registered satisfies the "definitive registration+provisional registration" condition, the learning device 10 shifts the curve information to the "definitive registration+provisional registration state" as indicated by an arrow S6. In addition, when the curve information that has been definitively registered does not satisfy the "definitive registration+provisional registration" condition, the learning device 10 updates the definitive registration state of the curve information as indicated by an arrow S7.

In the learning device 10, an upper limit value of the number of pieces of curve information that can be held in the definitive registration state is set in advance. For that reason, when the number of the curve information in the definitive registration state exceeds the upper limit value, the definitive registration state is canceled in order from older curve information, for example, as indicated by an arrow S8, and the state is shifted to the unlearned state. At that time, when there are multiple pieces of curve information that are simultaneously shifted to the definitive registration state, the learning device 10 may collectively shift the multiple pieces of curve information to the unlearned state. In addition, the learning device 10 may transition or delete the curve information to the unlearned state even when there is duplicate curve information.

Further, when the curve information that has been shifted to the "definitive registration+provisional registration state" satisfies the definitive registration condition again, the learning device 10 shifts the curve information to the definitive registration state as indicated by an arrow S9. When the number of pieces of curve information that have been shifted to the "definitive registration+provisional registration state" exceeds a predetermined value, the learning device 10 shifts to the provisional registration state in order from older curve information, for example, as indicated by an arrow S10. In addition, when the curve information that has been shifted to the "definitive registration+provisional registration state" satisfies the learning unnecessary condition, the learning device 10 shifts or deletes the curve information to the unlearned state as indicated by an arrow S11. In addition, when the curve information that has been shifted to the "definitive registration+provisional registration state" does not satisfy any of the transition conditions, the learning device 10 defers the curve information in the "definitive registration+provisional registration state" as indicated by the arrow S12.

As described above, the learning device 10 registers the measurement curve as the provisional registration curve when the obtained actual measurement data satisfies the predetermined provisional registration condition. As a result, the measurement curve enters the provisional registration state. Then, when the vehicle travels again on the traveling curve, and when the provisional registration curve corresponding to the traveling curve and the new measurement curve newly acquired for the traveling curve satisfy the predetermined definitive registration condition, the learning device 10 registers a curve obtained by averaging the provisional registration curve and the new measurement curve as the definitive registration curve. As a result, the measurement curve corresponding to the traveling curve passes through the provisional registration state and becomes the definitive registration state as the average value with the new measurement curve. In the next route guidance process, the learning device 10 outputs the guide route using the road information that has been registered.

Next, an operation example of the road learning process by the learning device 10 will be described. Note that the road learning process is a process performed on the traveling curve along which the vehicle actually traveled, and therefore, is performed after the vehicle has passed through the traveling curve. The road learning process includes a provisional registration process and a definitive registration process.

Provisional Registration Process

Figure 9:
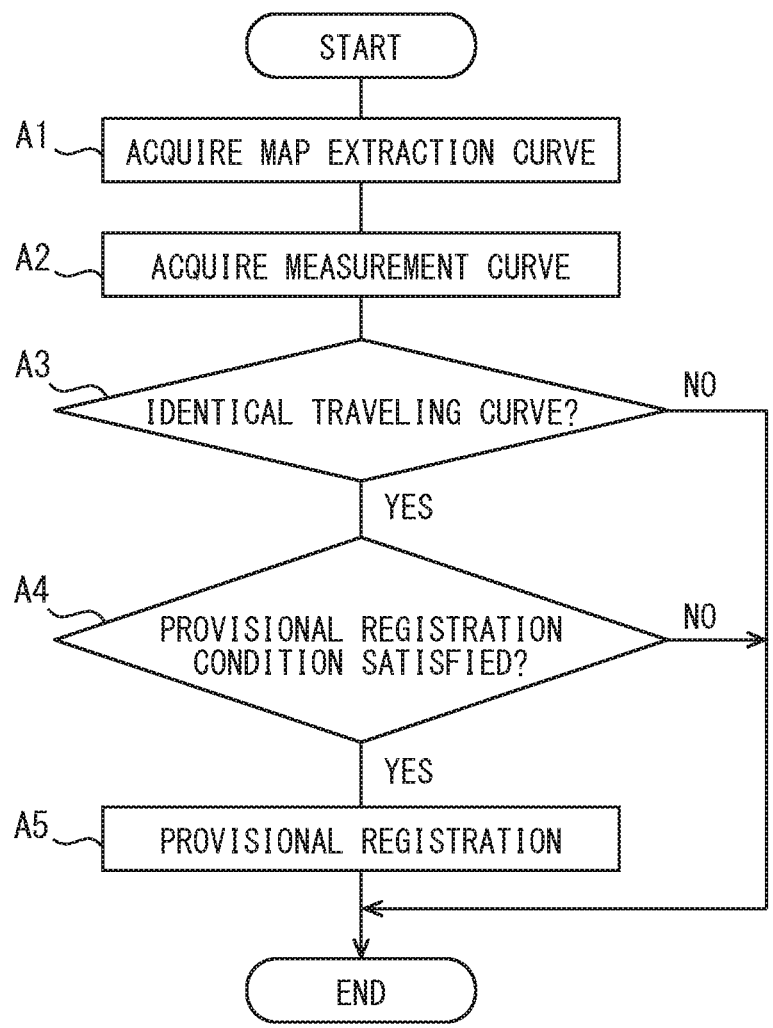
FIG. 9 is a flowchart showing an example of a provisional registration process.

As illustrated in FIG. 9, upon starting the provisional registration process, the learning device 10 acquires a map extraction curve extracted from the map data with respect to the traveling curve along which the vehicle has traveled (A1). The learning device 10 acquires a measurement curve extracted from the traveling locus of the vehicle (A2). A2 may be executed before S1, or may be executed simultaneously with S1.

The learning device 10 determines whether the acquired map extraction curve and measurement curve correspond to an identical traveling curve (A3). When the map extraction curve and the measurement curve correspond to the identical traveling curve (YES in A3), the learning device 10 determines whether the map extraction curve and the measurement curve satisfy the predetermined provisional registration condition (A4). When both the curve information satisfy the provisional registration condition (YES in A4), the learning device 10 registers the measurement curve as the provisional registration curve (A5), and terminates the provisional registration process. When both the curve information do not correspond to the identical traveling curve (NO in A3), or when both the curve information do not satisfy the provisional registration condition (NO in A4), the learning device 10 terminates the provisional registration process without performing the provisional registration of the measurement curve.

Definitive Registration Process

Figure 10:
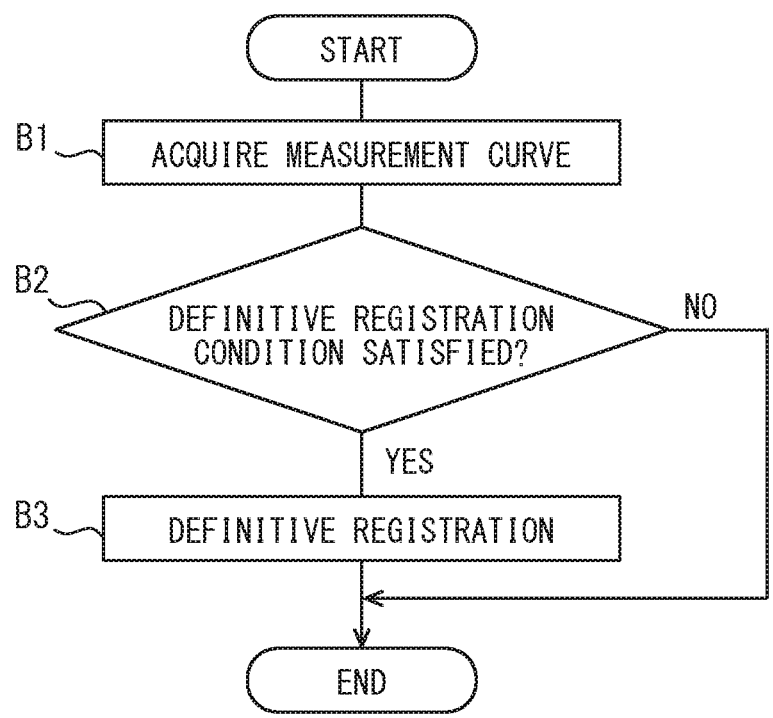
FIG. 10 is a flowchart showing an example of a definitive registration process.

As illustrated in FIG. 10, when the vehicle travels again in the traveling curve in which the measurement curve is provisionally registered, the learning device 10 acquires the measurement curve extracted from the traveling locus of the vehicle in the current travel (B1). The learning device 10 determines whether the provisional registration curve provisionally registered in association with the traveling curve and the measurement curve newly acquired in B1, that is, the new measurement curve, satisfy the predetermined definitive registration condition (B2). When both the curves satisfy the definitive registration condition (YES in B2), the learning device 10 registers a curve obtained by averaging the provisional registration curve and the new measurement curve as the definitive registration curve (B3), and terminates the definitive registration process. When both the curve information do not satisfy the definitive registration condition (NO in B2), the learning device 10 terminates the definitive registration processing without shifting the provisional registration curve to the definitive registration curve.

Next, an example of learning the curve information by the learning device 10 will be described. In the figure, the curve information of the provisional registration state is indicated by a dashed line. In the learning example 1 exemplified in FIG. 11, map extraction curves 100, 101 and a measurement curve 102 are extracted at the time of a first traveling. When the provisional registration condition is satisfied, the measurement curve 102 is provisionally registered. Then, a new measurement curve 103 is obtained at the time of a second traveling. When the measurement curve 102 and the new measurement curve 103 that are provisionally registered satisfy the definitive registration condition, a curve obtained by averaging the provisional registration curve 102 and the new measurement curve 103 is registered as a definitive registration curve 104.

Further, a new measurement curve 105 is obtained at the time of a third traveling. When the provisional registration condition is satisfied, the measurement curve 105 is provisionally registered. At the time of a fourth travel, a new measurement curve 106 is further obtained. When the measurement curve 105 and the new measurement curve 106 which are provisionally registered satisfy the definitive registration condition, a curve obtained by averaging the provisional registration curve 105 and the new measurement curve 106 is registered as a definitive registration curve 107. At that time, the definitive registration curve 104 is deleted. In other words, the definitive registration curve 104 is rewritten by the definitive registration curve 107.

Figure 12:
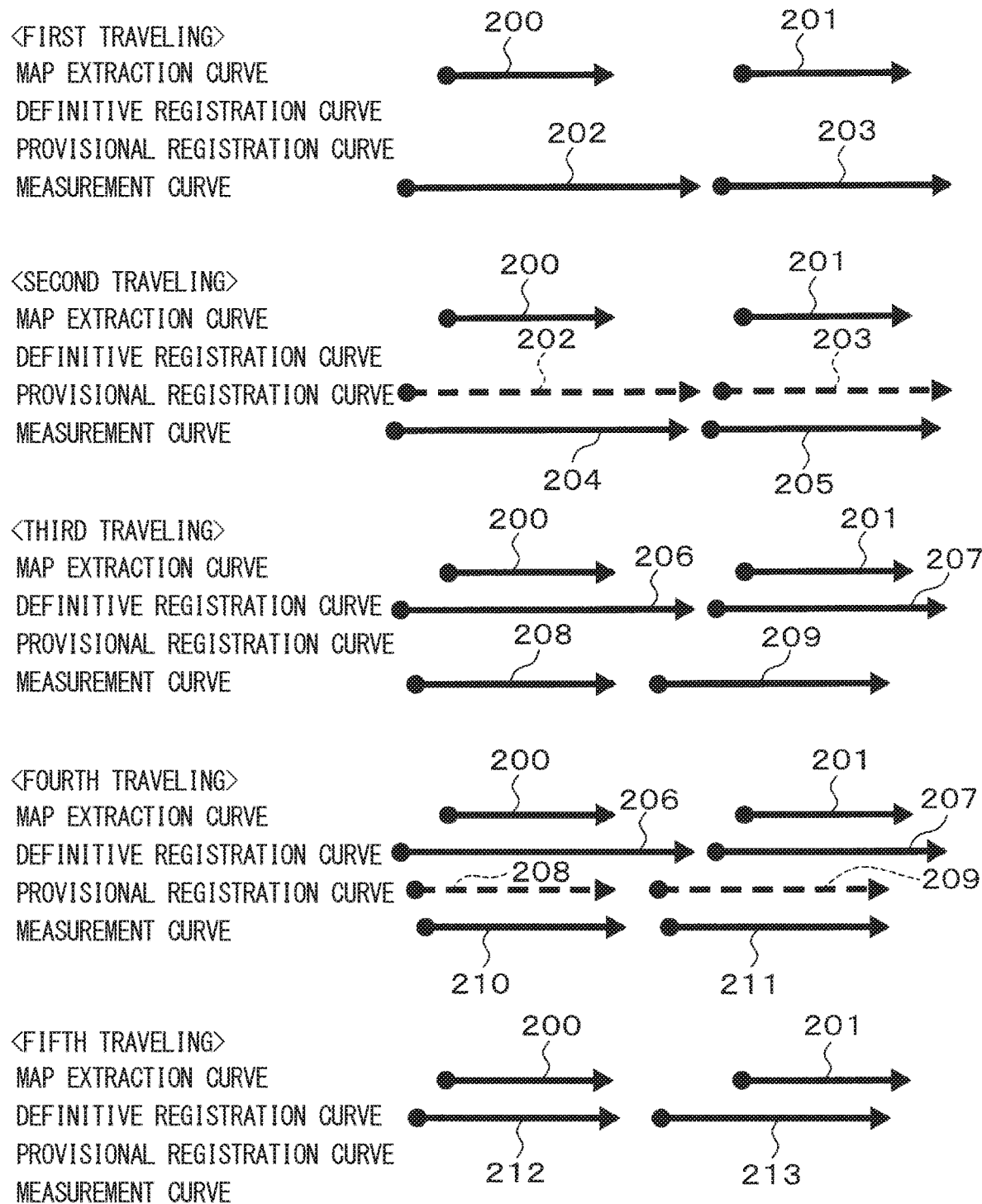
FIG. 12 is a diagram showing an example of learning curve information (part 2)

In a learning example 2 exemplified in FIG. 12, map extraction curves 200, 201 and measurement curves 202, 203 are extracted at the time of a first traveling. When the provisional registration condition is satisfied, the measurement curves 202, 203 are provisionally registered. At the time of a second traveling, new measurement curves 204 and 205 are obtained. When the measurement curve 202 and the new measurement curve 204 which are provisionally registered satisfy the definitive registration condition, a curve obtained by averaging the provisional registration curve 202 and the new measurement curve 204 is registered as a definitive registration curve 206. When the measurement curve 203 and the new measurement curve 205 which are provisionally registered satisfy the definitive registration condition, a curve obtained by averaging the provisional registration curve 203 and the new measurement curve 205 is registered as a definitive registration curve 207.

In addition, new measurement curves 208 and 209 are obtained at the time of a third traveling. When the provisional registration condition is satisfied, the measurement curves 208 and 209 are provisionally registered. At the time of the fourth traveling, new measurement curves 210 and 211 is obtained. When the measurement curve 208 and the new measurement curve 210 which are provisionally registered satisfy the definitive registration condition, a curve obtained by averaging the provisional registration curve 208 and the new measurement curve 210 is registered as a definitive registration curve 212. At that time, the definitive registration curve 206 is deleted. In other words, the definitive registration curve 206 is rewritten by the definitive registration curve 212. When the measurement curve 209 and the new measurement curve 211 which are provisionally registered satisfy the definitive registration condition, a curve obtained by averaging the provisional registration curve 209 and the new measurement curve 211 is registered as the definitive registration curve 213. At that time, the definitive registration curve 207 is deleted. In other words, the definitive registration curve 207 is rewritten by a definitive registration curve 213.

Figure 13:
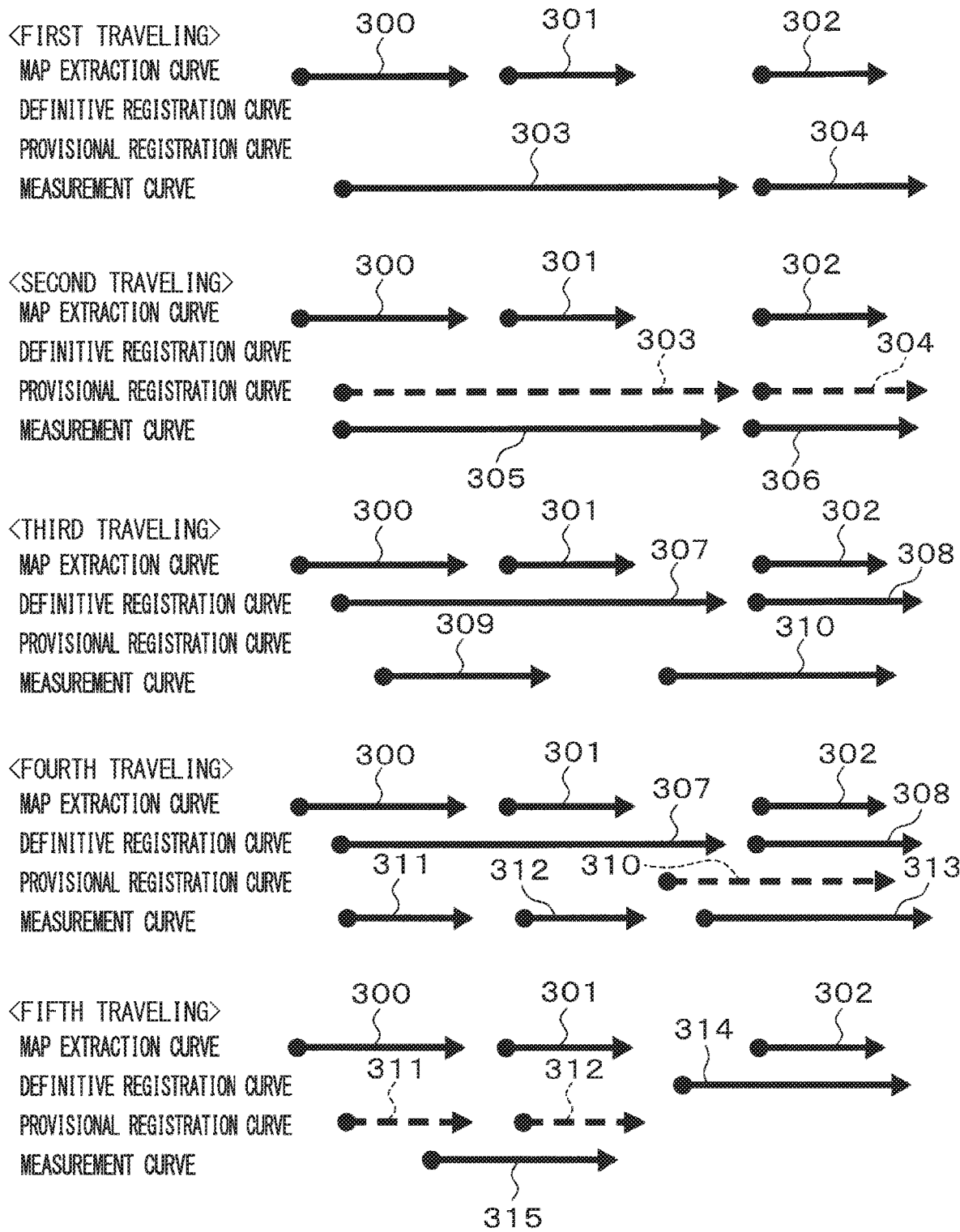
FIG. 13 is a diagram showing an example of learning curve information (part 3)

In a learning example 3 shown in FIG. 13, map extraction curves 300, 301, 302 and measurement curves 303, 304 are extracted at the time of a first driving. When the provisional registration condition is satisfied, the measurement curves 303 and 304 are provisionally registered. At the time of a second traveling, new measurement curves 305 and 306 are obtained. When the measurement curve 303 and the new measurement curve 305 which are provisionally registered satisfy the definitive registration condition, a curve obtained by averaging the provisional registration curve 303 and the new measurement curve 305 is registered as a definitive registration curve 307. When the measurement curve 304 and the new measurement curve 306 which are provisionally registered satisfy the definitive registration condition, a curve obtained by averaging the provisional registration curve 304 and the new measurement curve 306 is registered as a definitive registration curve 308.

In addition, new measurement curves 309 and 310 are obtained at the time of a third traveling. When the provisional registration condition is satisfied, measurement curves 309 and 310 are provisionally registered. In this case, the measurement curve 309 cannot be associated with any of the map extraction curves 300 and 301. For that reason, the measurement curve 309 is discarded.

At the time of a fourth traveling, new measurement curves 311, 312, and 313 are obtained. When the measurement curve 310 and the new measurement curve 313 provisionally registered satisfy the definitive registration condition, a curve obtained by averaging the provisional registration curve 310 and the new measurement curve 313 is registered as a definitive registration curve 314. At this time, the definitive registration curves 307 and 308 are deleted. In other words, the definitive registration curves 307 and 308 are rewritten by the definitive registration curve 314. The new measurement curves 311 and 312 are provisionally registered when the provisional registration condition is satisfied. A new measurement curve 315 is further obtained, and thereafter, it is determined whether the definitive registration condition is satisfied in relation to the provisional registration curve 311 or the provisional registration curve 312.

In a learning example 4 shown in FIG. 14, map extraction curves 400, 401 and measurement curves 402, 403, 404 are extracted at the time of a first traveling. When the provisional registration condition is satisfied, the measurement curves 402, 403, 404 are provisionally registered. At the time of a second traveling, new measurement curves 405, 406, 407 are obtained. When the measurement curve 402 and the new measurement curve 405 that are provisionally registered satisfy the definitive registration condition, a curve obtained by averaging the provisional registration curve 402 and the new measurement curve 405 is registered as a definitive registration curve 408. When the measurement curve 403 and the new measurement curve 406 which are provisionally registered satisfy the definitive registration condition, a curve obtained by averaging the provisional registration curve 403 and the new measurement curve 406 is registered as a definitive registration curve 409. When the measurement curve 404 and the new measurement curve 407 that are provisionally registered satisfy the definitive registration condition, a curve obtained by averaging the provisional registration curve 404 and the new measurement curve 407 is registered as a definitive registration curve 410.

In addition, new measurement curves 411 and 412 are obtained at the time of the third traveling. When the provisional registration condition is satisfied, the measurement curves 411 and 412 are provisionally registered. In this case, the measurement curve 412 cannot be associated with the map extraction curve 401. Therefore, the measurement curve 412 is discarded.

At the time of a fourth traveling, new measurement curves 413 and 414 are obtained. When the measurement curve 411 and the new measurement curve 413 which are provisionally registered satisfy the definitive registration condition, a curve obtained by averaging the provisional registration curve 411 and the new measurement curve 413 is registered as a definitive registration curve 415. At that time, the definitive registration curves 408, 409, and 410 are deleted. In other words, the definitive registration curves 408, 409, and 410 are rewritten by the definitive registration curve 415. The new measurement curve 414 is provisionally registered when the provisional registration condition is satisfied. Thereafter, when the new measurement curve is obtained, the provisionally registered curve 414 is determined to satisfy whether the definitive registration condition based on the relationship with the new measurement curve.

According to the present embodiment, it is determined whether the map extraction curve extracted from the map data and the measurement curve extracted from the traveling locus of the vehicle correspond to an identical traveling curve. As a result, the road learning can be performed after associating the curve shape extracted from the map data with the curve shape extracted from the traveling locus of the vehicle, and accurate road learning can be performed in accordance with the actual travel situation.

Further, according to the present embodiment, the measurement curve is registered as the provisional registration curve when the predetermined provisional registration condition is satisfied, and thereafter, the provisional registration curve is promoted to the definitive registration curve when a predetermined definitive registration condition is satisfied in a case where the vehicle travels along the identical-curve again. In other words, according to the present embodiment, since the curve shape is learned through a two-stage registration process, more accurate road learning can be performed.

Further, according to the present embodiment, when there is no map extraction curve corresponding to the measurement curve, the measurement curve is discarded, thereby being capable of excluding the measurement curve which cannot be associated with the map extraction curve from a learning target. In other words, road learning can be prevented from being performed on the basis of the measurement curve which is extremely distant from the map extraction curve.

According to the present embodiment, when the multiple map extraction curves corresponding to one measurement curve exist, one map extraction curve is selected and associated with the measurement curve, thereby being capable of setting one measurement curve most corresponding to the map extraction curve as the learning target, and being capable of improving the accuracy of road learning.

Further, according to the present embodiment, when the multiple measurement curves exist for one map extraction curve, all measurement curves associated with one map extraction curve can be learned by associating all the measurement curves with the map extraction curve, and the accuracy of road learning can be improved.

Further, according to the present embodiment, in a case where the vehicle travels on the traveling curve again, if the provisional registration curve corresponding to the traveling curve and the new measurement curve newly acquired for the traveling curve do not satisfy the definitive registration condition, the provisional registration curve is updated by the new measurement curve. In other words, even when the curve information in the provisional registration state is not shifted to the definitive registration state, the provisional registration curve is updated by the new measurement curve at any time, so that the accuracy of road learning can be improved.

The present disclosure is not limited to the embodiments described above, and can be applied to various embodiments without departing from the spirit of the present disclosure. For example, the contents of various transition conditions such as the identical-curve determination condition, the provisional registration condition, the definitive registration condition, the learning unnecessary condition, and the "definitive registration+provisional registration" condition can be appropriately changed and implemented. When it is determined that the map extraction curve and the measurement curve correspond to the identical traveling curve, the road information learning device 10 may be configured so that the measurement curve can be directly registered as the definitive registration curve without passing through the provisional registration on the condition that the predetermined definitive registration condition is satisfied.

When the multiple provisional registration curves exist for one map extraction curve, all of the provisional registration curves may be shifted to the definitive registration state when there are a provisional registration curve that satisfies the condition for shifting to the definitive registration state, a provisional registration curve that satisfies the condition for updating the provisional registration state, and a provisional registration curve that satisfies the condition for deleting the provisional registration curve. In other words, when the state transition conditions of the respective provisional registration curves are different from each other, priorities may be assigned in the order of transition to the definitive registration state, update of the provisional registration state, and deletion of the curve information, and all the provisional registration curves may be processed in the same manner as that of the provisional registration curves of the condition with the highest priority.

The flowcharts described in the present disclosure, or the processing of the flowcharts, are configured by a plurality of parts (or steps) each of which is represented by, for example, A1. Furthermore, each part may be divided into a plurality of sub-parts, while a plurality of parts may be combined into one part. In addition, each unit configured in this manner may be referred to as a circuit, a device, a module, or a means.

Also, each or a combination of the plurality of parts may be implemented as (i) a software part in combination with a hardware unit (for example, a computer), as well as (ii) a hardware part (for example, an integrated circuit, a wired logic circuit), with or without the functionality of the associated device. Further, the hardware part can be configured inside the microcomputer.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

What is claimed is:

1. A road information learning device comprising:
a curve information acquisition unit configured to acquire a map extraction curve extracted from map data and a measurement curve extracted from a traveling locus of a vehicle for a traveling curve along which the vehicle travels;
an identical-curve determination unit configured to determine whether the map extraction curve and the measurement curve acquired by the curve information acquisition unit correspond to an identical traveling curve; and
a definitive registration unit configured to register the measurement curve as a definitive registration curve when the identical-curve determination unit determines that the map extraction curve and the measurement curve correspond to the identical traveling curve, and a predetermined definitive registration condition is satisfied, wherein
the identical-curve determination unit has a plurality of identical-curve determination conditions for determining whether the map extraction curve and the measurement curve correspond to the identical traveling curve,
the identical-curve determination conditions include: a traveling direction of the measurement curve coinciding with a traveling direction of the map extraction curve; a curve polarity of the measurement curve coinciding with a curve polarity of the map extraction curve; and one of a plurality of sub conditions being satisfied,
the sub conditions include: a section of the map extraction curve being included in a section of the measurement curve; a section of the measurement curve being included in the map extraction curve; an entrance error between the map extraction curve and the measurement curve being within a first predetermined percentage of a section length of the map extraction curve; and an exit error between the map extraction curve and the measurement curve being within a predetermined percentage of the section length of the map extraction curve,
the identical-curve determination unit determines that the map extraction curve and the measurement curve correspond to the identical traveling curve when all of the identical-curve determination conditions are satisfied,
the identical-curve determination conditions further include one of a plurality of additional conditions being satisfied, and
the additional conditions include: the map extraction curve to be determined being not associated with another measurement curve; the measurement curve to be determined being not associated with another map extraction curve, and a travel control being not performed within a traveling curve section in which the measurement curve is extracted.

2. The road information learning device according to claim 1, further comprising:
a provisional registration unit configured to register the measurement curve as a provisional registration curve when the identical-curve determination unit determines that the map extraction curve and the measurement curve correspond to the identical traveling curve, and the map extraction curve and the measurement curve satisfy a predetermined provisional registration condition, wherein
the definitive registration unit is further configured to register a curve obtained by averaging the provisional registration curve and a new measurement curve, which is a measurement curve newly acquired by the curve information acquisition unit for the traveling curve, as the definitive registration curve when the vehicle travels along the traveling curve again, and the provisional registration curve corresponding to the traveling curve and the new measurement curve satisfy the definitive registration condition.

3. The road information learning device according to claim 2, wherein
the provisional registration unit is further configured to update the provisional registration curve with the new measurement curve when the vehicle travels along the traveling curve again, and the provisional registration curve corresponding to the traveling curve and the new measurement curve do not satisfy the definitive registration condition.

4. The road information learning device according to claim 1, wherein
the identical-curve determination unit is further configured to discard the measurement curve when the map extraction curve corresponding to the measurement curve does not exist.

5. The road information learning device according to claim 1, wherein
the identical-curve determination unit is further configured, when a plurality of the map extraction curves corresponding to one of the measurement curves exists, to select one of the map extraction curves and to associate the one of the map extraction curves with the one of the measurement curves.

6. The road information learning device according to claim 1, wherein
the identical-curve determination unit is further configured, when a plurality of the measurement curves exists for one of the map extraction curves, to associate all of the measurement curves with the one of the map extraction curves.

7. A road information learning device comprising:
a memory storing a control program; and
a processor, when executing the control program, is configured to:
acquire a map extraction curve extracted from map data and a measurement curve extracted from a traveling locus of a vehicle for a traveling curve along which the vehicle travels;

determine whether the map extraction curve and the measurement curve correspond to an identical traveling curve; and register the measurement curve as a definitive registration curve when the map extraction curve and the measurement curve correspond to the identical traveling curve, and a predetermined definitive registration condition is satisfied, wherein the control program includes a plurality of identical-curve determination conditions for determining whether the map extraction curve and the measurement curve correspond to the identical traveling curve, the identical-curve determination conditions include: a traveling direction of the measurement curve coinciding with a traveling direction of the map extraction curve; a curve polarity of the measurement curve coinciding with a curve polarity of the map extraction curve; and one of a plurality of sub conditions being satisfied, the sub conditions include: a section of the map extraction curve being included in a section of the measurement curve; a section of the measurement curve being included in the map extraction curve; an entrance error between the map extraction curve and the measurement curve being within a first predetermined percentage of a section length of the map extraction curve; and an exit error between the map extraction curve and the measurement curve being within a predetermined percentage of the section length of the map extraction curve, the processor, when executing the control program, is further configured to determine that the map extraction curve and the measurement curve correspond to the identical traveling curve when all of the identical-curve determination conditions are satisfied, the identical-curve determination conditions further include one of a plurality of additional conditions being satisfied, and the additional conditions include: the map extraction curve to be determined being not associated with another measurement curve; the measurement curve to be determined being not associated with another map extraction curve, and a travel control being not performed within a traveling curve section in which the measurement curve is extracted.

8. The road information learning device according to claim 7, wherein the processor, when executing the control program, is further configured to:

register the measurement curve as a provisional registration curve when the map extraction curve and the measurement curve correspond to the identical traveling curve, and the map extraction curve and the measurement curve satisfy a predetermined provisional registration condition, and register a curve obtained by averaging the provisional registration curve and a new measurement curve, which is a measurement curve newly acquired for the traveling curve, as the definitive registration curve when the vehicle travels along the traveling curve again, and the provisional registration curve corresponding to the traveling curve and the new measurement curve satisfy the definitive registration condition.

9. The road information learning device according to claim 8, wherein the processor, when executing the control program, is further configured to update the provisional registration curve with the new measurement curve when the vehicle travels along the traveling curve again, and the provisional registration curve corresponding to the traveling curve and the new measurement curve do not satisfy the definitive registration condition.

10. The road information learning device according to claim 7, wherein the processor, when executing the control program, is further configured to discard the measurement curve when the map extraction curve corresponding to the measurement curve does not exist.

11. The road information learning device according to claim 7, wherein the processor, when executing the control program, is further configured, when a plurality of the map extraction curves corresponding to one of the measurement curves exists, to select one of the map extraction curves and to associate the one of the map extraction curves with the one of the measurement curves.

12. The road information learning device according to claim 7, wherein the processor, when executing the control program, is further configured, when a plurality of the measurement curves exists for one of the map extraction curves, to associate all of the measurement curves with the one of the map extraction curves.

\* \* \* \* \*